United States Patent
Chen et al.

(10) Patent No.: US 6,797,402 B2
(45) Date of Patent: Sep. 28, 2004

(54) INSULATED HEAT SHIELD WITH WAVED EDGE

(75) Inventors: Colin Ching-Ho Chen, Barrington, IL (US); Frank Popielas, Naperville, IL (US); Calin Matias, London (CA)

(73) Assignee: Dana Corporation, Toledo, OH (US)

(*) Notice: Subject to any disclaimer, the term of this patent is extended or adjusted under 35 U.S.C. 154(b) by 82 days.

(21) Appl. No.: 09/966,123

(22) Filed: Sep. 28, 2001

(65) Prior Publication Data
US 2004/0142152 A1 Jul. 22, 2004

(51) Int. Cl.⁷ ............................................. B21C 37/00
(52) U.S. Cl. .................. 428/595; 428/121; 428/550; 428/551; 60/323; 60/322
(58) Field of Search ................. 428/121, 550, 428/551, 595; 60/323, 322

(56) References Cited

U.S. PATENT DOCUMENTS 5,590,524 A    1/1997  Moore, III et al.
5,958,603 A    9/1999  Ragland et al.

Primary Examiner—Deborah Jones
Assistant Examiner—Jane Rhee
(74) Attorney, Agent, or Firm—Rader, Fishman & Grauer, PLLC

(57) ABSTRACT

An improved heat shield offers thermal insulation and reduced noise transmission for vehicular engine components, including exhaust manifolds. The structure has three layers: an outer structural metal layer, a center insulation layer to isolate heat and dampen noise, and an inner metal layer directly adjacent the shielded component for reflecting heat back to the shielded component. As disclosed, the shield has at least one edge portion defined by outwardly flared undulations or waves. The waved edge minimizes impact of plastic deformation of the metal edges during manufacture of the shield, which tends to produce wrinkling at the edges, and creates undesirable stiffness. Finally, the edge boundary of the outer metal heat shield layer is folded over the edges of the insulation and inner metal layers to avoid any sharp edges, thus preventing injury to installers and reinforcing the heat shield structure to enhance useful life under vibration and heat conditions.

12 Claims, 2 Drawing Sheets

INSULATED HEAT SHIELD WITH WAVED EDGE

BACKGROUND OF THE INVENTION

1. Field of Invention

The present invention relates to protective structures for vehicular engine parts, such as engine exhaust manifolds for example, that generate substantial heat and vibration during engine operation. More particularly, the invention relates to fabrication of protective heat shields applied to engine parts for insulating such parts from other components within an engine compartment of a vehicle.

2. Description of the Prior Art

The exhaust manifolds of internal combustion engines in today's modern vehicles can reach under-the-hood temperatures in the neighborhood of 1600 degrees Fahrenheit. Such high temperatures create significant risks of damage to electronic components sharing under the hood space with the manifolds. Thus protection has been provided for such components via use of heat shields designed to cover up, and hence insulate, exhaust manifolds and other heat generating components. In some cases, the shields have been effective to reduce measured temperature levels to within a range of 300 degrees Fahrenheit, along with substantial commensurate reductions in noise levels. Typical heat shields, however, comprise at least two metal layers that sandwich an installation layer. The metal layers are created from single layer blanks by so-called forming dies.

The forming dies used to manufacture the metal heat shield layers are prone to creating winkles at rounded edges of the metal layers where the layers are subject to highest stresses within the dies. The wrinkled edges represent plastically deformed, crushed together portions in which the yield strength of the metal has been exceeded. Such portions are subject to cracks, and give rise to crack propagation issues. The crushed together portions also define thicker portions in the shield body that are stiffer and more prone to producing echoes rather than to absorbing vibrations and/or noise.

SUMMARY OF THE INVENTION

The present invention provides an improved insulated heat shield for engine components, such as exhaust manifolds of internal combustion engines. In the described embodiment, a heat shield is formed as a unitary structure adapted for securement via bolted connections to an engine manifold.

In the described embodiment, the shield includes three layers; an outer metal layer to provide overall structural integrity, a center layer formed of an insulation material to isolate heat and to dampen noise, and an inner metal layer adjacent the shielded component for reflecting heat back to the shielded component.

Also in the described embodiment, the edges of the metal layers are defined by outwardly flared undulations or waves to minimize stiffness produced by plastic deformation that occurs in the edges of the layer during manufacture of the shield. In addition, the waved edges are folded over to avoid cutting hands and/or fingers of installers or assemblers, or even under-the-hood wiring and hose structures. The folded edges also provide reinforcement of the composite heat shield structures, and thus serve to optimize useful life. Finally, a system of integrally incorporated beads in the metal layers is effective to provide selective stiffness in regions of the layer where needed.

DETAILED DESCRIPTION OF THE PREFERRED EMBODIMENTS

Figure 1:
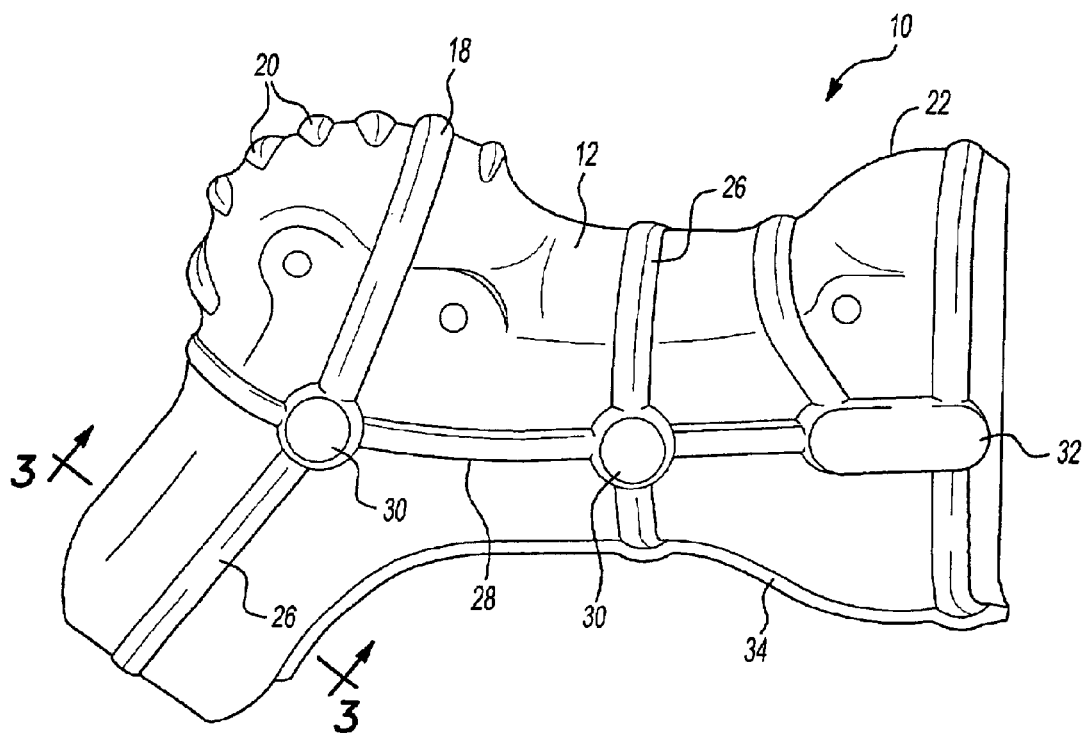
FIG. 1 is a perspective view of the described embodiment of the beat shield of the present invention, adapted to be installed over an exhaust manifold of an engine.
Figure 2:
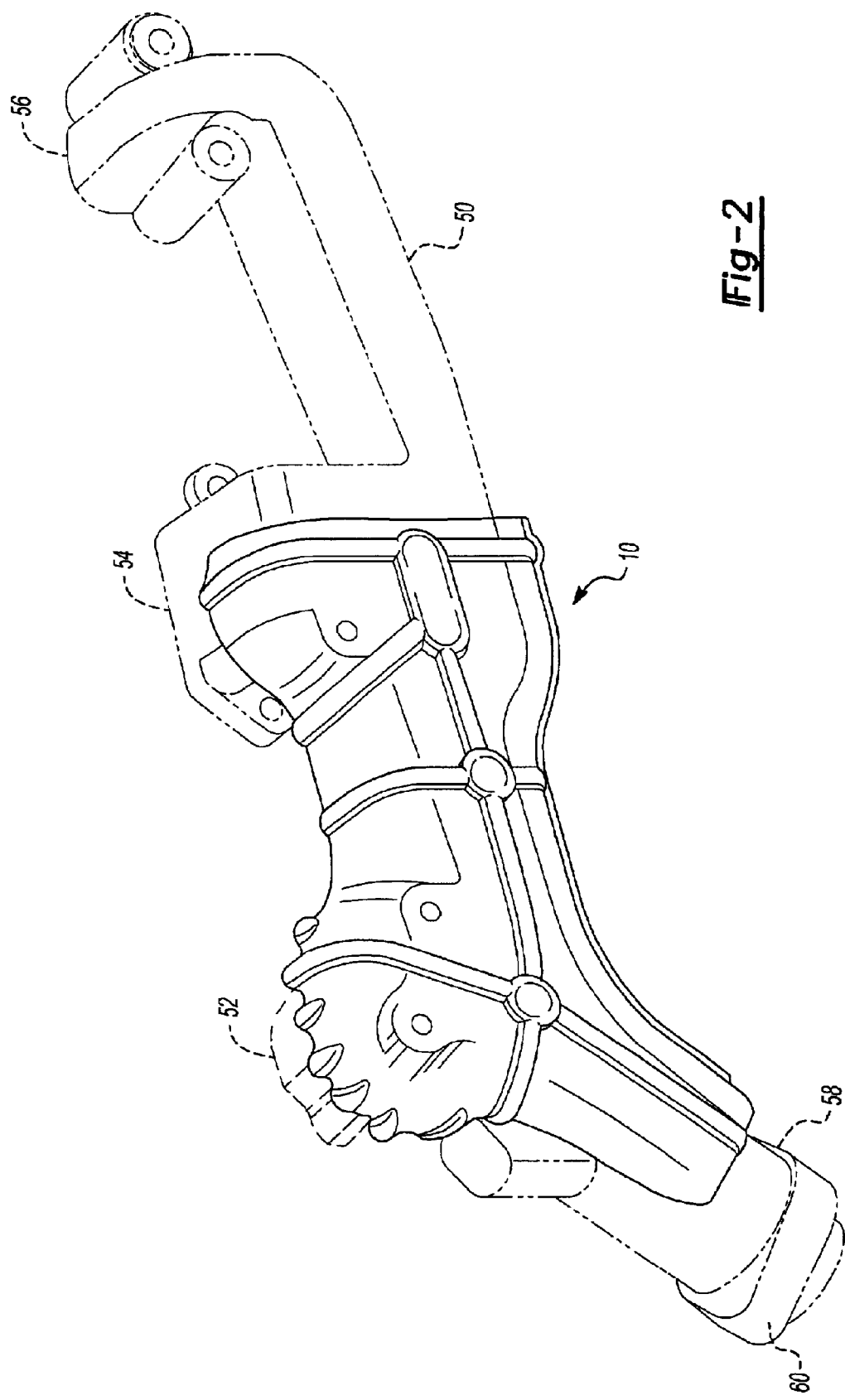
FIG. 2 is a perspective view of the heat shield of FIG. 1, shown installed over an exhaust manifold in accordance with the present invention.

Referring initially to FIGS. 1 and 2, an under-the-hood engine component 50, shown in phantom as a heavy-duty cast-iron exhaust manifold, is adapted for being bolted to a plurality of exhaust ports of an internal combustion engine (not shown). The manifold 50 includes mounting bosses 52, 54, 56 for securement of the manifold to the plurality of engine exhaust ports.

The engine exhaust ports operate to collectively receive exhaust gases from individual combustion chambers of the engine, and to funnel exhaust gases into a common exhaust pipe portion 58 of the manifold 50. An exhaust pipe mounting flange 60 is integrally provided on the exhaust pipe portion 58 for securement to a separate exhaust pipe for facilitating passage of exhaust gases to atmosphere.

Figure 3:
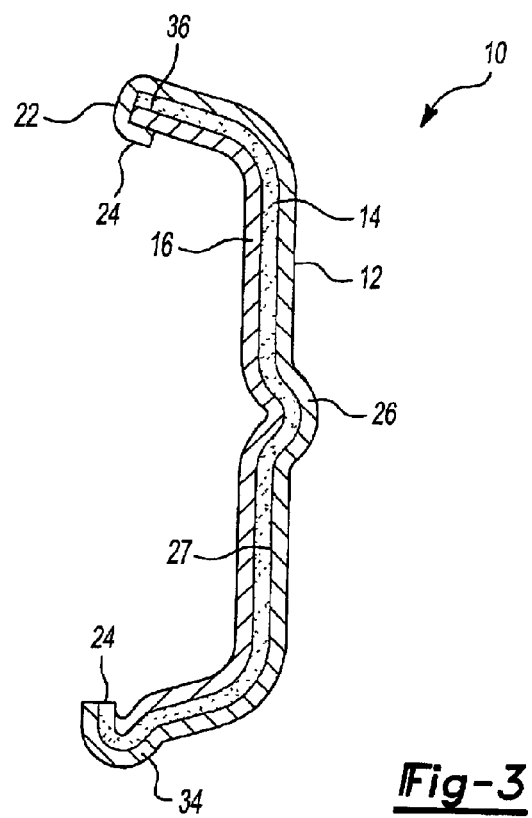
FIG. 3 is a cross-sectional view of a portion of the heat shield, shown along lines 3–3 of FIG. 1 to reveal interior layers of the heat shield.

Referring now particularly to FIGS. 1 and 3, an integral, one-piece heat shield 10 is adapted to encase or closely surround at least portions of the manifold 50, as depicted. The heat shield 10 has a body consisting of three layers; an external or outer metal layer 12 to provide structural integrity and overall rigidity, a center layer 14 of insulation material to isolate temperature and to dampen vibration and noise, and an inner metal layer 16 adjacent the shielded component for reflecting heat back to the shielded component. The respective layers are sandwiched together to form a unitary body as particularly shown in FIG. 3.

The outer metal layer may be preferably formed of cold rolled steel, aluminized steel, aluminum, and even stainless steel for more exotic vehicles where cost is less of a factor. If cold rolled steel is utilized, the exterior of the shield may be coated with a corrosion-resistant material to enhance longevity of the shield.

The inner metal layer 16 is the portion of the shield 10 in closest contact with the exhaust manifold. To the extent that the temperatures of the manifold can reach the 1600 degrees Fahrenheit range, the material of the inner metal layer should be able to withstand significant heat. In some applications the inner layer may be formed of high-temperature alloys, and in others can be of cheaper materials including aluminum-clad steel. Those skilled in the art will appreciate choice of materials may be critical for avoiding degradation associated with elevated temperatures and for handling considerable vibrations in particular applications.

The material choices for the insulating and dampening center layer 14 are fairly broad. Such choices may include non-metallic fibers such as aramid fibers, or ceramic fiber paper. Depending on anticipated temperature ranges, even non-fiber compositions may be employed, such as densified vermiculite powders, for example.

One particular aspect of this invention relates to control of vibration and noise attenuation properties of the shield 10, particularly as related to progressive forming dies used to manufacture the metallic shield layers 12 and 16. To the extent that such dies are prone to creating plastically deformed, and even crushed, metal, particularly at the edges of the layers, an undulating, outwardly flared edge portion 18 is provided in the layers 12 and 16 to counteract any undesirable stiffness in the crushed metal edge imparted by dies during manufacture of the shield 10.

The undulating or "waved" edge portion 18 is defined by a series of protrusions 20 spaced apart along at least one edge portion 18 of the heat shield, each protrusion 20 having a shape and disposition on the edge 18 similar to that of an elephant toe (FIG. 1). The edge portion 18 can be distributed about the circumference of the entire boundary of the shield 10, or may be positioned in selective regions thereabout, depending on desired objectives of balancing stiffness, and/or controlling or attenuating vibration.

Referring now particularly to FIG. 3, another aspect of the present invention is that the entire boundary edge 22 of the outer layer 12, of which the undulating edge portion 18 is one part, is folded over so as to fully encase the insulation layer 14 and the inner metal layer 16. The folded over portion 24 eliminates sharp edges by providing a boundary trim, and thus avoids injuries such as the cutting of hands and/or fingers of production line workers, or property damage such as cutting of the hoses and wires already attached in place to the engine.

A further aspect of the shield 10 is the inclusion of beads 26, 28 (FIG. 1) that extend generally vertically and horizontally, respectively, over the body of the shield 10. The beads provide a degree of stiffness in the shield to facilitate handling and installation. However, resonance and vibration control provide the primary determinants of actual number and sizes of the beads. A plurality of node bosses 30 are also included, each positioned at an intersecting junction of vertical and horizontal beads 26, 28. The bosses 30 assure avoidance of sharp corners that might otherwise give rise to potential for cracks, and or propagation of cracks. The bosses 30 are circular in shape. Alternatively, an oval or oblong boss 32 may be employed to accommodate a junction involving greater numbers of intersecting vertical and horizontal beads, as also shown in FIG. 1.

Finally, while the beads 26, 28 are adapted to extend over the general body portions of the shield 10, a boundary edge bead 34 is adapted to be positioned along at least one boundary edge, as shown in FIGS. 1 and 3, to impart additional controlled stiffness, as may be desired for particular applications.

The described invention is a versatile heat shield that may be designed by finite element and modal analyses to establish design parameters including resonant frequencies and stiffness requirements. The designer must be aware that to optimize the control of noise attenuation and vibration phenomenon it will be necessary to tune the heat shield 10 to the particular engine vibrations anticipated. Such tuning is achieved via not only the use of the beads 26, 28, and 34, but also will be controlled at least in part by thickness of the respective shield layers. In the described embodiment, the metal layers 12, 16 are each 0.4 mm thick, while the intermediately sandwiched insulation layer 14 is 0.9 mm thick. The folded over portion 24 provides approximately 2 mm of overlap beyond the inside boundary edge 36 (FIG. 3) of the layer 16.

One method of manufacturing of the heat shield 20 can be described as follows. Each of the inner and outer metal layers 16, 12 are stamped from sheet metal, and formed in a progressive die to the shapes depicted. The insulation layer 14 is then applied into the concave inside surface 27 of the outer metal layer 12, and the inner metal layer 16 is placed atop the insulation layer. Next the previously described boundary edge 22 of the relatively oversized outer layer 12 is folded over to create the folded over portion 24 positioned over the respective mated edge 36 of the inner metal layer, effectively encapsulating the insulation layer 14 between the metal layers 12 and 16.

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled.

What is claimed is:

1. A heat shield for an under-the-hood vehicular engine component comprising three layers: an outer metal layer, an insulation layer, and an inner metal layer adapted to be positioned directly proximal to a shielded component, said insulation layer positioned intermediately between said metal layers, said layers collectively providing thermal insulation of, and reduced noise transmission from, said component, wherein at least one edge portion of said heat shield comprises outwardly flared undulations.

2. The heat shield of claim 1, wherein said outer metal layer of said heat shield comprises a circumferential edge boundary, wherein said boundary is folded over to fully encase mating ends of said insulation layer and said inner metal layer.

3. The heat shield of claim 2, wherein said circumferential edge boundary of said outer metal layer of the heat shield are folded over said mating edges to avoid sharp edges and to reinforce said heat shield structure under conditions of vibration and heat.

4. The heat shield of claim 3 wherein said component comprises an exhaust manifold fixed to engine said exhaust manifold serving to carry hot engine gases away from said engine.

5. The heat shield of claims 3 wherein said outwardly flared undulations define protuberances spaced apart along said one edge portion of said heat shield.

6. The heat shield of claim 4 further comprising a series of generally orthogonally disposed beads extending over the body of said shield.

7. The heat shield of claim 6 further comprising a plurality of arcuate nodes positioned at the intersections of each of said orthogonally disposed beads.

8. The heat shield of claim 7 wherein said inner metal layer directly adjacent said shielded component serving to reflect heat back to the shielded component.

9. The heat shield of claim 8 wherein a plurality of said nodes is distributed over the body of said shield, each node having a circular shape.

10. The heat shield of claim 9 wherein said circumferential boundary edges of said outer metal layers of said heat shield are folded over said mating edges to avoid sharp edges to protect hands and fingers of an installer from contact with sharp edges.

11. A heat shield for an under-the-hood vehicular engine component comprising three layers: an outer metal layer, an insulation layer, and an inner metal layer adapted to be positioned directly proximal to the shielded component, said insulation layer positioned intermediately between said metal layers, said layers collectively providing thermal insulation of, and reduced noise transmission from, said component, and wherein at least one edge portion of said heat shield comprises outwardly flared undulations, and wherein said outwardly flared undulations define protuberances spaced apart along said one edge portion of said heat shield.

12. A heat shield for an under-the-hood vehicular engine component comprising three layers: an outer metal layer, an insulation layer, and an inner metal layer adapted to be positioned directly proximal to the shielded component, said insulation layer positioned intermediately between said metal layers, said layers collectively providing thermal insulation of, and reduced noise transmission from, said component, wherein said outer metal layer of said heat shield comprises a circumferential edge boundary, wherein said boundary is folded over to fully encase mating ends of said insulation layer and said inner metal layer to avoid sharp edges and to reinforce said heat shield structure under conditions of vibration and heat.

* * * * *

UNITED STATES PATENT AND TRADEMARK OFFICE

Certificate

Patent No. 6,797,402 B2                                                      Patented: September 28, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Colin Ching-Ho Chen, Barrington, IL (US); Frank Popielas, Naperville, IL (US); Calin Matias, London (CA); and Viorel Stefan, London (CA).

Signed and Sealed this Twenty-fourth Day of June 2008.

*PATRICK J. RYAN*
*Supervisory Patent Examiner*
*Art Unit 1795*